Figure 1:
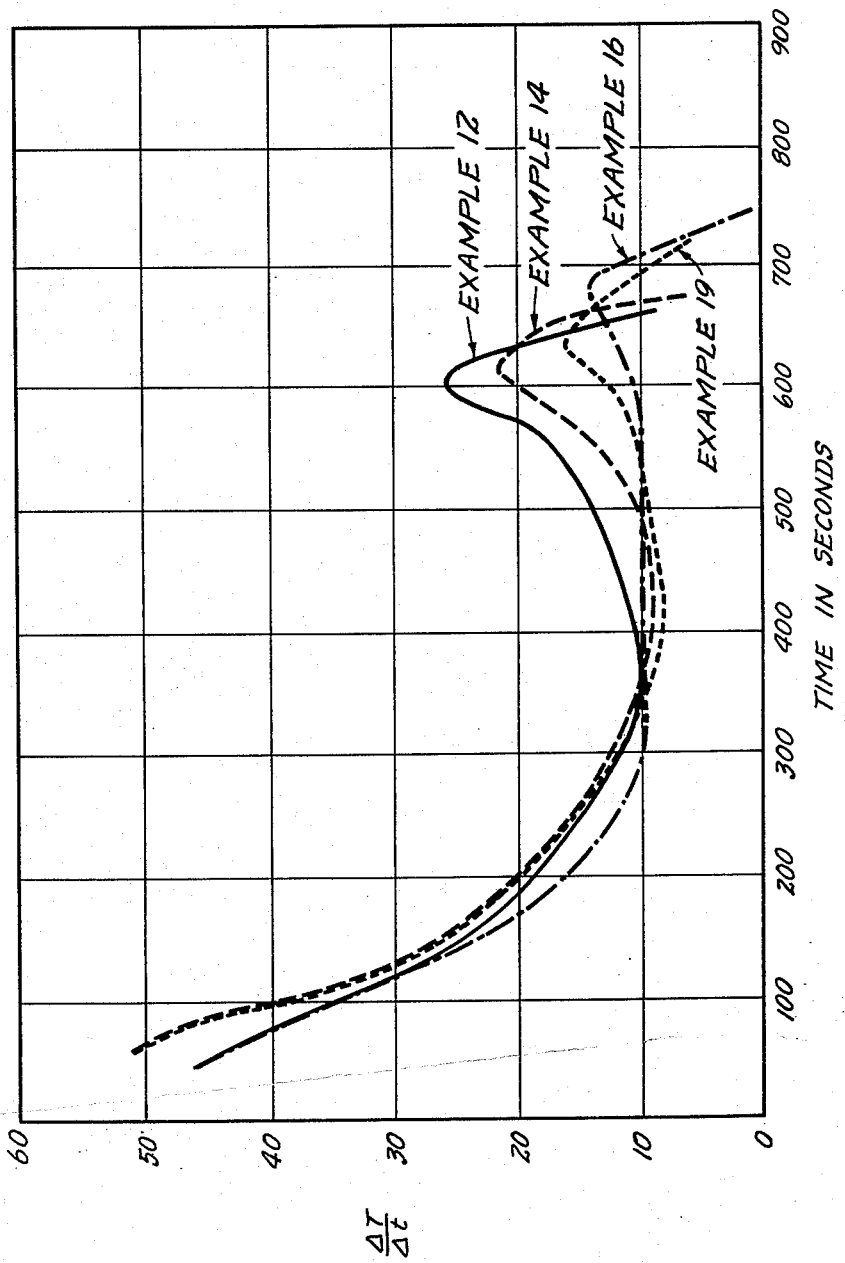

United States Patent Office 2,809,944
Patented Oct. 15, 1957

2,809,944

PROCESSES FOR THE RECLAIMING OF RUBBER AND FOR THE PRODUCTION OF HARD RUBBER PRODUCTS AND THE LIKE, AND THE PRODUCTS THEREOF

Edward F. Sverdrup, Buffalo, N. Y., assignor to U. S. Rubber Reclaiming Co., Inc., Buffalo, N. Y., a corporation of New York Application June 11, 1956, Serial No. 590,598

22 Claims. (Cl. 260—2.3)

This invention relates to processes for reclaiming vulcanized natural and/or synthetic rubber in the absence or presence of resinous materials to provide vulcanizable products which are moldable into products in the nature of hard rubber and for other purposes and for providing products in the nature of hard rubber and otherwise.

This application is a continuation-in-part of my copending applications: Serial No. 313,983, filed October 9, 1952; Serial No. 343,793, filed March 20, 1953; Serial No. 381,111, filed September 18, 1953, and Serial No. 446,379, filed July 28, 1954.

There is a great need for improved processes of reclaiming rubber in such a manner that the reclaimed product may be revulcanized with particular effectiveness.

There is, moreover, a great need in the mechanical arts for hard, tough, non-metallic materials which possess certain of the qualities of those hard rubbers which are vulcanized directly from raw rubber but which can be more economically produced. There is also a wide need in the electrical arts for such materials having good insulating properties.

With the foregoing and other considerations in view, the present invention contemplates the reclaiming of vulcanized rubber by mechanical working and heat in the presence of substantial amounts of added free sulfur, and the revulcanization of the reclaimed product in the presence of additional sulfur. In this procedure, the heat facilitates a desirable preliminary cross-linking of the rubber molecules as the added sulfur combines with the rubber, while, at the same time, the mechanical action and heat plasticizes the rubber and maintains it in a plastic condition.

Any of the usual rubbers, e. g., scrap from tires and tubes, may be utilized in accordance with the invention. Mention is specifically made of natural rubber and GR-S (Buna-S).

For effective results the comminuted vulcanized rubber scrap may be mixed with sulfur and reclaimed in an extrusion plasticator at elevated temperature in the range 300° F. to 500° F., and mechanically worked during reclaiming, as by forcing the material toward and thru a restricted orifice using a screw impeller.

Effective results are secured when from about 2.5% to about 20% of sulfur is employed with respect to the vulcanized rubber scrap. In standard practice, a percentage of from 2.5% to 16% gives excellent results, but for various purposes, as hereinafter set forth, percentages of sulfur from 2.5% to 5% or more, from 8% to 16%, and from about 6% to about 20% of the weight of whole tire vulcanized rubber scrap, for example, give particularly satisfactory results.

In the production of hard rubber, the reclaimed product is revulcanized in the usual manner, the required amounts of sulfur for revulcanization being added.

Again, altho a variety of rubbers or rubber-like materials and a variety of plastics whose properties differ from rubber are known, there is still great need for materials having particular properties, and the invention contemplates the reclaiming of vulcanized rubber in such a manner as to produce such materials. In certain instances, specific resins are included for certain specific purposes. Altho natural and synthetic rubbers—sometimes referred to as "elastomers"—are plastics in the broader sense of the word, I reserve that word herein for the "resinous" polymer materials other than such elastomers, since, as above indicated, there is a great need in the mechanical arts for hard, tough, non-metallic materials of the "rigid plastic" type; and there is also a wide need in the electrical arts for materials of such character which have good electrical insulating properties; and there is also a particular need for such materials which are less expensive than the accepted rigid plastics such as nylon, saran, and vinyl chloride copolymers.

In various of its more specific aspects, accordingly, the invention contemplates the provision of improved processes for the formation of products of the nature above indicated from vulcanized rubber scrap and thermosetting phenol-formaldehyde resins, and the provision of such products. I have found that this can be done most effectively by mixing such a resin with vulcanized rubber and reclaiming the rubber by plasticizing the materials in admixture by a joint working at a temperature within the rubber-reclaiming range. Pursuant to the invention, the reclaim may thereafter be cured by being subjected to vulcanizing conditions.

For effective results, the working should be against resistance as by working the material toward and forcing it thru a restricted orifice by a screw impeller. An effective temperature range for the working is 300° F. to 500° F., and a preferred range is from 325° F. to 475° F. The rubber molecules are broken down by the working action, and are cross-linked with the molecules of the plastic, the two materials being thus integrally unified and transformed into a new and different material.

The composition may be further cured by subsequent treatment if desired. An effective method of cure is that used in vulcanizing hard rubber such, for example, as that hereinafter set forth, and in general by a method employing from about 25 parts to about 47 parts of sulfur per 100 parts of rubber, as hydrocarbon.

Effective results are secured, for example, when 35% by weight or less of the uncured resinous material is mixed with 65% of comminuted vulcanized rubber. Generally good results, and best results in most instances, are obtained when the plastic is in the proportion range from 5% to 15% of the vulcanized rubber. Materials which have given effective results are thermosetting phenol-formaldehyde resins and nylon.

Altho products of the reclaiming of vulcanized rubber in the presence of thermosetting phenol-formaldehyde resins may be obtained without the addition of sulfur, highly effective results are obtained when from 2.5% to 5% or more of sulfur (with respect to the rubber scrap) is included in the mix which is subjected to working and plasticizing action. Best results have been obtained with from 3% to 4% of sulfur. The presence of sulfur greatly improves the molding characteristics of the composition and improves and facilitates the formation of a final hard-rubber-like product.

The process may be carried out in a screw plasticator such, for example, as that exemplified in Patent 2,653,-915 to Joseph C. Elgin and me.

The use of a plasticizer for the resinous material facilitates the working.

Any of a variety of commercial or chemical plasticizers may be used. Among them are dioctyl phthalate, dibutyl phthalate, and dibutyl sebacate.

The vulcanized rubber scrap and the resinous material may also be treated in other types of apparatus adapted for rubber-reclaiming, e. g., a Banbury or a Baker Perkins mixer.

Pursuant to the invention there may be effectively and inexpensively produced a molding composition of exceptional quality. This likewise has a greatly reduced tendency toward blastering, and an improved gloss.

An additional advantage of the use of the thermosetting phenol formaldehyde resins of the present invention is that scrap rubber may be reclaimed at the same time that the vulcanized material and the resinous material undergo a thorough mixing. The resin, indeed, serves to replace much of the reclaiming oils normally used in reclaiming operations.

There are certain instances, moreover, wherein vulcanized rubber may be mixed with nylon (a long-chain synthetic polymeric amide material which has recurring amide groups as an integral part of the main polymer chain) and with sulfur and the mixture subjected to mechanical working and heat to reclaim the rubber and to provide a product which can be vulcanized in the presence of additional sulfur to provide a hard insulating material.

Certain of the vulcanizable products thus produced can be milled into a smooth flat sheet which, when cured, will produce a hard rubber of exceptionally high elongation with little, if any, reduction in tensile. The percent elongation for rubbers having a tensile of from five to six thousand has, in the past, tended to run from one-half of one percent to one percent.

These products likewise have a greatly reduced tendency toward blistering, and an improved gloss.

An additional advantage is that scrap rubber may be reclaimed at the same time that the vulcanized material and the nylon undergo a thorough mixing. The nylon, indeed, serves to replace much of the reclaiming oils normally used in reclaiming operations.

For most effective results, the working should be against resistance as by working the material toward and forcing it through a restricted orifice by a screw impeller, as in Patent 2,653,915 to Joseph C. Elgin and me. An effective temperature range for the working is 300° F. to 500° F., and a preferred range is from 325° F. to 475° F.

The composition may be further cured by subsequent treatment if desired, to produce hard, tough materials of the rigid plastic type having good insulating properties. An effective method of cure is that used in vulcanizing hard rubber, such, for example, as that hereinafter set forth, or other method employing from about 25 parts to about 47 parts of sulfur per 100 parts of rubber hydrocarbon.

Effective results are secured, for example, when 35% by weight or less of finely divided nylon is mixed with 65% of comminuated vulcanized rubber scrap. In general, good results are obtained when 5% or more of nylon or other material is used with respect to a vulcanized rubber scrap. From 2.5% to 5% or more of sulfur (with respect to the vulcanized rubber scrap) is included in the mix prior to its final working. Best results have been obtained with from 3% to 4% of sulfur. The presence of sulfur greatly improves the molding characteristics of the composition and improves and facilities the formation of a final hard-rubberlike product.

In certain of its aspects, the invention contemplates the production of a reclaimed rubber product which can be used effectively either in dust form or otherwise in the molding of high-quality battery boxes, electrical specialties, linings and coverings, pails, funnels, dippers, pipes and fittings, tanks, trays, etc. In the formation of such hard-rubber products, hard rubber is ground to a dust and serves to prevent gassing when compounded and cured with raw rubber, sulfur, and other ingredients. Pursuant to the present invention, a reclaimed product is provided which is usable to replace some or all of the hard rubber dust in such formulations. Highly effective results for such purposes are obtained when scrap vulcanized rubber is reclaimed by working the same in the presence of a high quantity of added sulfur. The reclaim, particularly when formed with higher amounts of sulfur, tends to be fairly hard, and can thus be easily ground or otherwise broken up into pellet or powder form. Whether or not broken up, the material is thereafter vulcanized, with or without other vulcanizable materials, in the presence of additional sulfur to provide molded and other vulcanized products. When used as a substitute for hard rubber dust, it not only tends to prevent gassing, but is advantageous because it is particularly easy to work on a mill and to disperse in the raw polymer.

The reclaimed product may, for example, be used in extruded or slab form. It may also be used in pellet or powder form with or without additional sulfur and other compounding ingredients, and in this form may be employed as a "molding powder" from which molded materials may be formed. For the purpose of providing a substitute for hard rubber dust, the quantity of sulfur should be from 6% to 20% by weight of whole tire scrap, e. g., from 12% to 40% by weight of the rubbery hydrocarbon content of the scrap, the term "hydrocarbon" being used in its usual sense in the rubber industry to include rubbery hydrocarbon material with which sulfur has been combined, as well as uncombined rubbery hydrocarbon. Preferably, from about 8% to about 16% (based on the weight of whole tire scrap) of added sulfur is employed. For the purpose of making superior cured products from the reclaim itself by revulcanizing with additional sulfur, the vulcanized rubber may be reclaimed with from about 6% to about 15% of added sulfur. For purposes of use as a molding powder, from 6% to 20% may be most effectively used.

Effective results may be secured by reclaiming in a plasticator such as set forth in Patent 2,653,915 issued to Joseph C. Elgin and me, at process temperatures of from 300° F. to 500° F.

The working of the scrap inhibits the bringing about of a condition wherein the rubber molecules are so crosslinked by the sulfur molecules as to provide a highly vulcanized or hard-rubber product. The added sulfur is combined with the rubber without excessive cross-linking. The reclaimed scrap, in spite of relatively low Mooney figures, i. e., less than 100, contains less than three-quarters of one percent of free sulfur.

Tire scrap forms a readily available source of used vulcanized rubbery material for reclaiming according to the invention. Tires formed of various mixtures of natural rubber and GR-S, such as used on automobiles and airplanes, may be satisfactorily reclaimed, as may tires formed of natural rubber, of GR-S, or of other types of rubbers or mixtures thereof as used and usable in tires; and such a vulcanized rubber or a mixture of rubbers may, of course, be employed whether or not embodied in a tire.

There may be included in the mix various resinous materials, fillers, etc., as required in a particular case. The invention accordingly comprises the several steps and the relation and order of one or more of such steps with respect to each of the others, and the products possessing the features and properties which are exemplified in the following detailed disclosure, and the scope of the application of which will be indicated in the claims.

Figure 2:
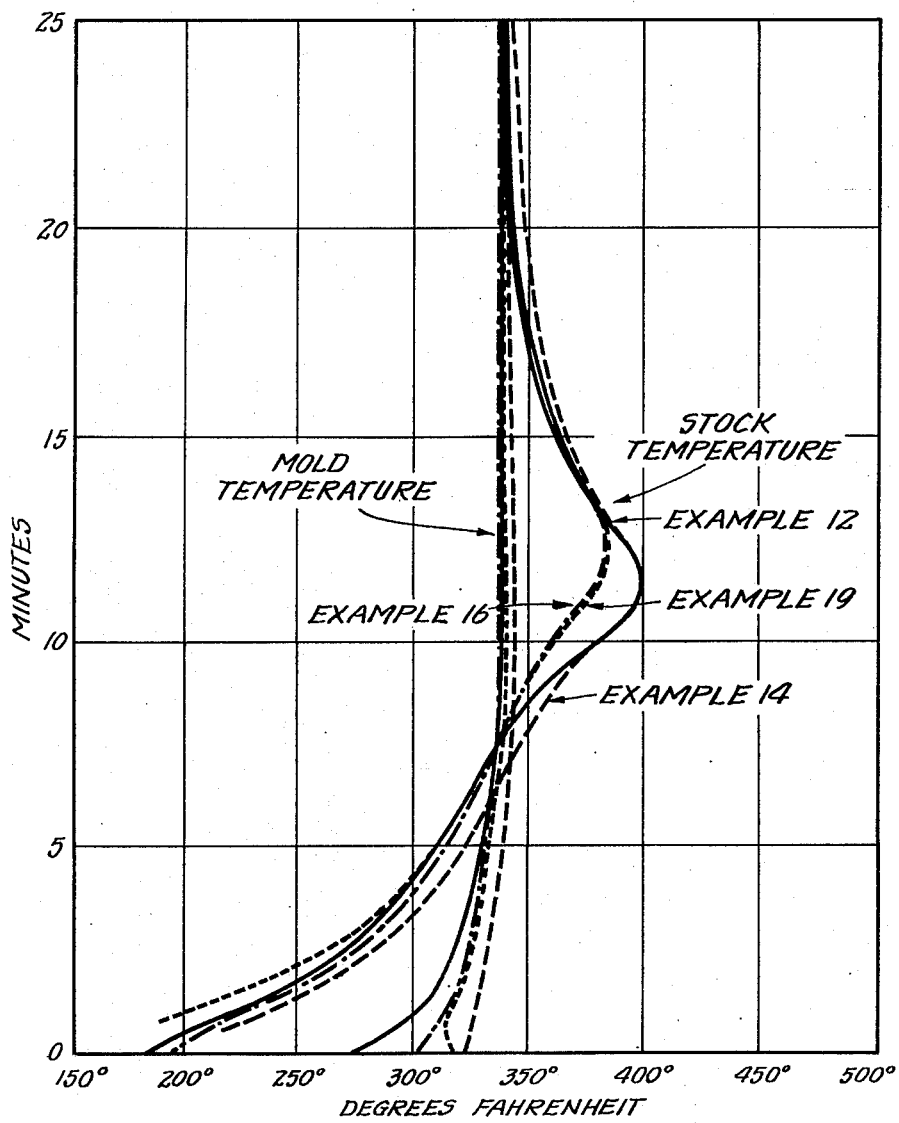

For a fuller understanding of the nature and objects of the invention, reference should be had to the following detailed description taken in connection with the accompanying drawings, in which:

Figure 1 shows exothermic heat curves during the curing steps of certain of the examples; and Fig. 2 shows the rate of temperature rise during the exothermic portion of these cures.

While there are given below certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

Example 1

100 parts of 30-mesh whole tire crumb were mixed with 3.0 parts of pulverized sulfur and 5.0 parts of petroleum resin and passed thru a 3" screw plasticator as set forth in Patent 2,653,915 to Joseph C. Elgin and me, at a thruput of 30 pounds per hour. The jacket temperature of the machine was 309° F. The resulting material was then refined once on a laboratory refiner.

When 500 parts of the refined material were compounded with 70 parts of sulfur, 28 parts of chemically hydrated lime, and 3 parts of an accelerator (e. g., a reaction product of butyraldehyde and butylidene aniline), and cured in a mold for 20 minutes at 338° F., an excellent hard-rubber product excellently molded was obtained. The cured product had a tensile strength of 3601 pounds per square inch, an elongation of 3.4% and a Shore "D" hardness of 86.

Example 2

100 parts of 30-mesh whole tire crumb were mixed with 3.0 parts of pulverized sulfur, 5.0 parts of petroleum resin and 3.75 parts of a commercial plasticizer as set forth above or in Example 4 below, and passed thru a 3" screw plasticator (as above) rotating at 60 R. P. M. The jacket temperature of the machine was 310° F. The resulting material was then refined once on a laboratory refiner.

When 500 parts of the refined material were compounded with 70 parts of sulfur, 28 parts of chemically hydrated lime, and 3 parts of an accelerator (a reaction product of butyraldehyde and butylidene aniline) and cured for 20 minutes at 338° F., an excellent hard rubber product was obtained.

The cured product had a tensile strength of 3657 pounds per square inch, an elongation of 4.8% and a Shore "D" hardness of 86.

Example 3

100 parts of 30-mesh whole tire crumb were mixed with 15.0 parts of pulverized sulfur and 5.0 parts of petroleum resin and passed thru a 3" screw plasticator (as above), at a thruput of 30 pounds per hour. The jacket temperature of the machine was 309° F. The resulting material was then refined once on a laboratory refiner.

When 500 parts of the refined material were compounded with 30 parts of sulfur, 28 parts of chemically hydrated lime, and 3 parts of an accelerator (e. g., a reaction product of butyraldehyde and butylidene aniline), and cured for 20 minutes at 338° F., an excellently molded hard-rubber product was obtained. The cured rubber had a tensile strength of 3183 pounds per square inch, an elongation of 1.8% and a Shore "D" hardness of 88.

Example 4

100 parts of 30-mesh whole tire crumb were mixed with 6.25 parts of a thermosetting phenolformaldehyde resin, 3.75 parts of plasticizer therefor, and 3.00 parts of pulverized sulfur and passed thru a 3" screw plasticator (as above), wherein a resistance to the working action is set up by a restricted exit orifice and whose jacket temperature was 302° F. The process temperature was 377° F. The amperage requirement was 14.9 at 440 volts (3 phase 60 cycle), and a flow rate approximately 48#/hr. was obtained. The extruded material had a Mooney viscosity ML/212/5-1 (a large rotor Mooney operated at 212° F. for 5 minutes following a one-minute warming up time) of 54.

When 500 parts of the resulting product are compounded with 70 parts of sulfur, 28 parts of chemically hydrated lime and 3.0 parts of accelerator (reaction product of butyraldehyde and butylidene aniline), and cured for 20 min. at 338° F., a hard product with excellent molding properties, and a Shore "D" hardness of 87, is obtained. The tensile and elongation are 4750 pounds per square inch and 2.6% respectively.

Example 5

100 parts of 12-mesh black inner tubes were mixed with 6.25 parts of thermosetting phenol-formaldehyde resin, 3.75 parts of plasticizer therefor, and 5.00 parts of pulverized sulfur and passed thru the 3" screw plasticator whose jacket temperature is 307° F. The process temperature is 350° F. The amps consumed at 440 volts is 15.7, and good extrusion is obtained with a rate of approximately 74#/hr. The Mooney viscosity ML/212/5-1 of the extruded product was 30.

500 parts of the product, when mixed with 70 parts of sulfur, 28 parts of the lime and 3.0 parts of accelerator (reaction product of butyraldehyde and butylidene aniline), and cured for 20 min. at 338° F. steam, gives a good molded article with a glossy finish, and a Shore "D" hardness of 83. The tensile and elongation are 5220 p. s. i. and 2.6% respectively. The product has a high impact resistance and heat distortion temperature of 118° F.

Example 6

100 parts of 30-mesh whole tire crumb were mixed with 6.25 parts of a thermosetting phenolformaldehyde resin, and 3.75 parts of plasticizer therefor, and passed thru the 3" screw plasticator whose jacket temperature was 300° F. The process temperature was 310° F., and a rate of 28#/hr. was obtained. The amperage was 11.2 amps at 440 volts. The extrusion of this material was good, and the material has a Mooney viscosity, ML/212/5-1, of 35.

200 parts of the product, when mixed with 35 parts of sulfur, 9 parts of the lime, and 0.9 parts of the accelerator, and cured for 30 minutes at 338° F., gives a hard rubber product with a Shore "D" hardness of 87. The tensile was 5195 p. s. i. and the elongation 3.1%. The molding characteristics of this product were, however, not as good as the material with the sulfur added to the plasticator mix.

Example 7

100 parts of thirty-mesh standard whole-tire scrap (fiber-free—from tires which originally contained cotton fabric) were blended in a mixer with 6 parts of molding powder formed from nylon having an extrusion temperature of from 428°–450° F. (FM 3606), 0.4 part of dixylyl disulfides, 1.3 parts of petroleum oil, 12 parts of petroleum resin, 3 parts of whiting, and 5 parts of sulfur, and then passed thru a 3" screw plasticator, as above, having a screw speed of 60 R. P. M., at a rate of 68 pounds per hour, an oil temperature of 349° F., and a process temperature of 318° F.

When the product was compounded, 500 parts of the product with 70 parts of sulfur, 28 parts of lime, and 3 parts of accelerator and cured, a hard-rubber-like product having a tensile strength of 4270 pounds per square inch, an elongation of 3%, and a Shore "D" hardness of 85 was obtained.

Example 8

100 parts of thirty-mesh standard whole-tire scrap were blended in a mixer with 8 parts of FM 3606 nylon molding powder, 0.3 part of dixylyl disulfides, 1.5 parts of petroleum oil, 14 parts of petroleum resin, 3 parts of whiting, and 3 parts of sulfur, and then passed thru a 3" screw plasticator, as above, having a screw speed of 60 R. P. M., at a rate of 32 pounds per hour, a jacket temperature of 296° F., and a process temperature of 349° F.

When compounded (500 parts with 70 parts of sulfur, 28 parts of lime, and 3 parts of accelerator) and cured, a hard-rubber-like product having a tensile strength of 3915 pounds per square inch, an elongation of 2.5%, and a Shore "D" hardness of 87 was obtained.

Example 9

100 parts of thirty-mesh standard whole-tire scrap were blended in a mixer with 8 parts of molding powder formed from nylon having an extrusion temperature of from 428° F.–450° F. (FM-3606), 6.25 parts of plasticizer and 3 parts of sulfur, and then passed thru a 3" screw plasticator, as above, having a screw speed of 60 R. P. M., at a rate of 24 pounds per hour, a jacket temperature of 354° F., and a process temperature of 370° F.

When compounded (500 parts with 70 parts of sulfur, 28 parts of lime, and 3 parts of accelerator) and cured, a hard-rubber-like product having a tensile strength of 3930 pounds per square inch, an elongation of 2.5% and a Shore "D" hardness of 84 was obtained.

Example 10

100 parts of thirty-mesh standard whole-tire scrap were blended in a mixer with 6.25 parts of scrap nylon fabric, 8 parts of petroleum resin, and 4 parts of sulfur, and then passed thru a 3" screw plasticator, as above, having a screw speed of 60 R. P. M., at a rate of 38 pounds per hour, a jacket temperature of 325° F., and a process temperature of 365° F.

When compounded (500 parts with 65 parts of sulfur, 28 parts of lime, and 3 parts of accelerator) and cured, a hard-rubber-like product having a tensile strength of 4304 pounds per square inch, an elongation of 2.7% and a Shore "D" hardness of 88 was obtained.

Example 11

100 parts of thirty-mesh standard whole-tire scrap were blended in a mixer with 10 parts of scrap nylon fabric, 0.3 part of dixylyl disulfides, 12 parts of petroleum resin, and 4 parts of sulfur, and then passed thru a 3" screw plasticator, as above, having a screw speed of 60 R. P. M., at a rate of about 50 pounds per hour, a jacket temperature of 325° F., and a process temperature of 360° F.

When compounded (500 parts with 65 parts of sulfur, 28 parts of lime, and 3 parts of accelerator) and cured, a hard-rubber-like product having a tensile strength of 3732 pounds per square inch, an elongation of 2.5% and a Shore "D" hardness of 86 was obtained.

In the following examples, reference to "exothermic max. temp." refers to the internal rise in temperature which occurs during the combining of rubber and sulfur in the vulcanization of rubber to the hard rubber stage, which tends to increase the rate of vulcanization above that intended, and which produces porosity. This exothermic heat is measured for a slab of material plied up to fill a cavity the dimensions of which are 2½ x 2½ x ½ inches. This is heated in a single rectangular cavity in a steel mold. The mold is placed in the center of electrically heated platens and shielded from external air currents. An iron-constantan thermocouple is used to measure the temperature of the mold and another the temperature in the center of the slab. The couple for measuring the mold temperature is placed midway between the cavity and outer edge and at a point midway between top and bottom edges. The other couple is placed so that the tip is in the exact center of the slab. These couples are connected into a Brown electronic strip recorder, 0°–600° F., which records the mold and slab temperatures alternately at 15-second intervals.

The mold consists of four steel plates 12" x 12" x ¼" thick. Two of these plates are the cover plates. The other two plates form a split mold having a cavity in the center which is 2½" x 2½" x ½" deep.

The split mold permits insertion of one chrome-plated thermocouple tube ⅛" in diameter into the center of the cavity and one thermocouple into the mold itself. The tip of the mold thermocouple is situated halfway between one edge of the cavity and one edge of the plate.

The exothermic heat is markedly reduced by the use of the present invention. Curves of this nature for certain of the examples are shown in Fig. 1. Even more significant are the curves showing the rate of rise of temperature during the cure. Curves of this nature for the same examples are shown in Fig. 2.

In general, when the rate of rise exceeds 20° F. per minute in the exothermic portion of the curve, the compound is not safe to cure in thick sections (½" or over) at the test temperature (340° F.).

The reference to "blow-line" has to do with the porosity or internal cracks present in the interior of a piece of hard rubber, after curing. It is believed that they are caused by the rapid generation of gas ($H_2S$) caused by excessive internal heat (exothermic heat) which has not been dissipated rapidly enough during the curing.

Example 12

100 parts of 30-mesh whole-tire scrap (fiber-free) were mixed with 6 parts of sulfur, 8.0 parts of petroleum resin (PDO–40), and 2 parts of Turgum-S (a modified resin acid, specific gravity 1.06–1.07, softening point—Ring & Bal. 135° F.–145° F., with an acid number of 146). This mixture was passed thru a 3" plasticator, as set forth in Fig. 1 of said Patent 2,653,915 issued to Joseph C. Elgin and me, whose jacket temperature was 275° F. The process temperature was about 325° F. as measured by a thermocouple placed about in the center of the barrel and next externally to the liner.

When the product was press-cured 20' at 340° F. in the following formulation:

| | |
|---|---:|
| Product of Example 12 | 100.0 |
| Sulfur | 11.0 |
| Warner lime | 5.6 |
| Aldehyde amine accelerator (A–32) | 0.6 | a maximum exothermic heat of 357° F. was obtained. The tensile strength was 3720#/sq. in. and the elongation 2.0%. The Shore D hardness was 85.

When the product of Example 12 is used to replace hard rubber dust in a hard rubber formulation, excellent results are obtained. The following table shows the results when the base hydrocarbon is standard GR–S:

| Formulation: | | | |
|---|---|---|---|
| GR–S | 100 | 100 | 100. |
| Hard rubber dust | 100 | 100 | |
| Product of Example 12 (in the form of discrete particles such as described in the application of Benjamin R. Wendrow, Serial No. 326,933, filed December 19, 1952 now Patent 2,767,149). | 100 | 100 | 200. |
| Aldehyde amine accelerator (808) | 3 | 3 | 3. |
| Petroleum oil (Circo) | 7 | 7 | 7. |
| Sulfur | 45 | 49 | 63. |
| Exothermic max. temp., °F | 400 | 404 | 423. |
| Blow line in exothermic piece | Yes | Yes | Yes. |
| Molding | Very good | Very good | Very good. |
| Cure 20' at 340° F.: | | | |
| Tensile | 4,210 | 6,140 | 6,260. |
| Elongation | 7.7 | 3.8 | 4.2. |
| Hardness | 80 | 85 | 85. |
| Cure 25' at 340° F.: | | | |
| Tensile | 5,060 | 6,670 | 6,280. |
| Elongation | 6.1 | 2.9 | 5.3. |
| Hardness | 81 | 87 | 85. |
| Cure 30' at 340° F.: | | | |
| Tensile | 6,060 | 7,220 | 6,860. |
| Elongation | 2.9 | 3.2 | 5.0. |
| Hardness | 83 | 88 | 86. |

Example 13

100 parts of 30-mesh whole tire scrap (fiber-free) were mixed with 8.0 parts of sulfur, 8.0 parts of petroleum resin (PDO–40), and 2 parts of Turgum–S. This mixture was passed thru said 3″ plasticator whose jacket temperature was 250° F. The process temperature was about 330° F. as measured by a thermocouple placed about in the center of the barrel and next externally to the liner.

When the product was press-cured 20′ at 340° F. in the following formulation:

| | |
|---|---:|
| Product of Example 13 | 100.0 |
| Sulfur | 10.0 |
| Warner lime | 5.6 |
| Aldehyde amine accelerator (A–32) | 0.6 | a maximum exothermic heat of 358° was obtained. The tensile strength was 3775#/sq. in. and the elongation was 2.0%. The Shore D hardness was 86.

When the product of Example 13 was used to replace hard rubber dust in a hard rubber formulation, excellent results were obtained. The following table shows the results when the base hydrocarbon was standard GR–S:

| Formulation: | |
|---|---:|
| GR–S | 100.0 |
| Hard rubber dust | 100.0 |
| Product of Example 13 (as in Example 12) | 100.0 |
| Aldehyde amine accelerator (808) | 3.0 |
| Petroleum oil (Circo) | 7.0 |
| Sulfur | 45.0 |
| Blow line in exothermic piece | Yes |
| Exothermic max. temp., ° F. | 392° F. |
| Molding | Very good |
| Cure 20′ at 340° F.: | |
|   Tensile | 4150 |
|   Elongation | 9.7 |
|   Shore D hardness | 83 |
| Cure 25′ at 340° F.: | |
|   Tensile | 4285 |
|   Elongation | 4.3 |
|   Hardness | 86 |
| Cure 30′ at 340° F.: | |
|   Tensile | 5795 |
|   Elongation | 3.3 |
|   Hardness | 87 |

Example 14

100 parts of 30-mesh whole tire scrap (fiber-free) were mixed with 10 parts of sulfur, 8.0 parts of petroleum resin (PDO–40), and 2 parts of Turgum–S. This mixture was passed thru said 3″ plasticator whose jacket temperature was 275° F. The process temperature was about 325° F. as measured by a thermocouple placed about in the center of the barrel and next externally to the liner.

The product had a Mooney (MS/212/5–1) viscosity of 61 and a Shore D hardness average of 38.

When the product was press-cured 20′ at 340° F. in the following formulation:

| | |
|---|---:|
| Product of Example 14 | 100.0 |
| Sulfur | 9.0 |
| Warner lime | 5.6 |
| Aldehyde amine accelerator (A–32) | 0.6 | a maximum exothermic heat of 346° F. was obtained. The tensile strength was 2785#/sq. in. and the elongation 1.6%. The Shore D hardness was 85.

When the product of Example 14 is used to replace hard rubber dust in a hard rubber formulation, excellent results are obtained. The following table shows the results when the base hydrocarbon is standard GR–S:

| Formulation: | | |
|---|---:|---:|
| GR–8 | 100 | 100. |
| Hard rubber dust | 100 | — |
| Product of Example 14 (as in Example 12) | 100 | 200. |
| Aldehyde-amine accelerator (808) | 3 | 3. |
| Petroleum oil (Circo) | 7 | 7. |
| Sulfur | 45 | 55. |
| Blow line in exothermic piece | Yes | Yes. |
| Exothermic max. temp., ° F | 400 | 400. |
| Molding | Very good | Very good. |
| Cure 20′ at 340° F.: | | |
|   Tensile | 6,610 | 5,895. |
|   Elongation | 5.7 | 3.7. |
|   Hardness | 85 | 83. |
| Cure 25′ at 340° F.: | | |
|   Tensile | 6,690 | 5,790. |
|   Elongation | 3.0 | 3.0. |
|   Hardness | 87 | 86. |
| Cure 30′ at 340° F.: | | |
|   Tensile | 7,170 | 6,020. |
|   Elongation | 3.1 | 3.3. |
|   Hardness | 87 | 86. |

Example 15

100 parts of 30-mesh whole tire scrap (fiber-free) were mixed with 12 parts of sulfur, 8.0 parts of petroleum resin (PDO–40), and 2 parts of Turgum–S. This mixture was passed thru said 3″ plasticator whose jacket temperature was 250° F. The process temperature was about 320° F. as measured by a thermocouple placed about in the center of the barrel and next externally to the liner.

When the product of Example 4 was press-cured 20′ at 340° F. in the following formulation:

| | |
|---|---:|
| Product of Example 15 | 100.0 |
| Sulfur | 8.2 |
| Warner lime | 5.6 |
| Aldehyde amine accelerator (A–32) | 0.6 | a maximum exothermic heat of 347° F. was obtained. The tensile strength was 2330#/sq. in. and the elongation 1.7%. The Shore D hardness was 86.

When the product of Example 15 is used to replace hard rubber dust in a hard rubber formulation, excellent results were obtained. The following table shows the results when the base hydrocarbon was standard GR–S:

| Formulation: | |
|---|---:|
| GR–S | 100.0 |
| Hard rubber dust | 100.0 |
| Product of Example 15 (in powdered form) | 100.0 |
| Aldehyde amine accelerator (808) | 3.0 |
| Petroleum oil (Circo) | 7.0 |
| Sulfur | 45.0 |
| Blow line in exothermic piece | No |
| Exothermic max. temp. | 394° F. |
| Molding | Very good |
| Cure 20′ at 340° F.: | |
|   Tensile | 6140 |
|   Elongation | 4.3 |
|   Shore D hardness | 85 |
| Cure 25′ at 340° F.: | |
|   Tensile | 6370 |
|   Elongation | 3.3 |
|   Shore D hardness | 86 |
| Cure 30′ at 340° F.: | |
|   Tensile | 6870 |
|   Elongation | 3.0 |
|   Shore D hardness | 87 |

Example 16

100 parts of 30-mesh whole tire scrap (fiber-free) were mixed with 15 parts of sulfur, 8.0 parts of petroleum resin (PDO–40), and 2 parts of Turgum–S. This mixture was passed thru said 3″ plasticator whose jacket temperature was 275° F. The process temperature was about 325° F. as measured by a thermocouple placed about in the center of the barrel and next externally to the liner.

The product had a Mooney (MS/212/5-1) viscosity average of 84 and a Shore D hardness of 56. The free-sulfur content was 0.55.

When the product was press-cured 20' at 340° F. in the following formulation:

| | |
|---|---|
| Product of Example 16 | 100.0 |
| Sulfur | 7.0 |
| Warner lime | 5.6 |
| Aldehyde amine accelerator (A-32) | 0.6 | a maximum exothermic heat of 347° F. was obtained. The tensile strength was 3060#/sq. in., elongation 2.0%, and the Shore D hardness was 83.

When the product of Example 16 is used to replace hard rubber dust in a hard rubber formulation (instead of being used as the source of rubbery hydrocarbon), excellent results are obtained. The following table shows the results when the base hydrocarbon is standard GR-S:

| | Example 16 | Example 16a | Example 16b | Hard Rubber Dust |
|---|---|---|---|---|
| Formulation: | | | | |
| GR-S | 100 | 100 | 100 | 100. |
| Hard rubber dust | 100 | 100 | | 100. |
| Product of Example 16 (in powdered form) | 100 | 100 | 200 | |
| Aldehyde amine accelerator (808) | 3 | 3 | 3 | 3. |
| Petroleum oil (Circo) | 7 | 7 | 7 | 7. |
| Sulfur | 45 | 40.5 | 47 | 45. |
| Exothermic max. temp., °F | 384 | 378 | 385 | 389. |
| Blow line in exothermic piece | No | No | Yes | No. |
| Molding | Very good. | Very good. | Very good. | Good. |
| Cure 20' at 340° F.: | | | | |
| Tensile | 4,300 | 5,170 | 5,720 | |
| Elongation | 2.3 | 5.5 | 3.3 | |
| Hardness | 82 | 83 | 83 | |
| Cure 25' at 340° F.: | | | | |
| Tensile | 5,080 | 6,655 | 5,820 | 7,760. |
| Elongation | 2.3 | 3.3 | 3.0 | 5.3 |
| Hardness | 83 | 84 | 84 | 82. |
| Cure 30' at 340° F.: | | | | |
| Tensile | 5,720 | 6,680 | 5,740 | 7,930. |
| Elongation | 2.0 | 3.0 | 3.5 | 4.7. |
| Hardness | 84 | 86 | 85 | 83. |
| Cure 45' at 340° F.: | | | | |
| Tensile | | | | 8,350. |
| Elongation | | | | 4.0. |
| Hardness | | | | 85. |

*Example 17*

100 parts of 30-mesh whole-tire scrap (fiber-free) were mixed with 16.0 parts of sulfur, 12.0 parts of petroleum resin (PDO-40), and 3.0 parts of Turgum-S. This mixture was passed thru said 3" plasticator whose jacket temperature was 250° F. The process temperature was about 300° F. as measured by a thermocouple placed about in the center of the barrel and next externally to the liner.

The product of Example 17 did not cure satisfactorily in the following test formulation:

| | |
|---|---|
| Product of Example 17 | 100.0 |
| Sulfur | 6.6 |
| Warner lime | 5.6 |
| Aldehyde amine accelerator (A-32) | 0.6 |

When the product of Example 17 is used to replace hard rubber dust in a hard rubber formulation, excellent results are obtained. The following table shows the results when the base hydrocarbon is standard GR-S:

| | |
|---|---|
| Formulation: | |
| GR-S | 100.0 |
| Hard rubber dust | 100.0 |
| Product of Example 17 (in powdered form) | 100.0 |
| Aldehyde-amine accelerator (808) | 3.0 |
| Petroleum oil (Circo) | 7.0 |
| Sulfur | 45.0 |
| Blow line in exothermic piece | No |
| Exothermic max. temp., °F | 385 |
| Molding | Very good |
| Cure 20' at 340° F.: | |
| Tensile | 6270 |
| Elongation | 4.0 |
| Hardness | 85 |
| Cure 25' at 340° F.: | |
| Tensile | 6110 |
| Elongation | 3.3 |
| Hardness | 86 |
| Cure 30' at 340° F.: | |
| Tensile | 6670 |
| Elongation | 2.7 |
| Hardness | 68 |

*Example 18*

100 parts of 30-mesh whole-tire scrap (fiber-free) were mixed with 18.0 parts of sulfur, 14.0 parts of petroleum resin (PDO-40), and 3.5 parts of Turgum S. This mixture was passed thru said 3" plasticator whose jacket temperature was 250° F. The process temperature was about 312° F. as measured by a thermocouple placed about in the center of the barrel and next externally to the liner.

The product of Example 18, which had a Mooney (MS/212/5-1) viscosity of 91 and a Shore D hardness of 65, did not cure satisfactorily in the following test formulation:

| | |
|---|---|
| Product of Example 18 | 100.0 |
| Sulfur | 5.6 |
| Warner lime | 5.6 |
| Aldehyde amine accelerator (A-32) | 0.6 |

When the product of Example 18 is used to replace hard rubber dust in a hard rubber formulation, excellent results are obtained. The following table shows the results when the base hydrocarbon is standard GR-S:

| | |
|---|---|
| Formulation: | |
| GR-S | 100.0 |
| Hard rubber dust | 100.0 |
| Product of Example 18 (in powdered form) | 100.0 |
| Aldehyde amine accelerator (808) | 3.0 |
| Petroleum oil (Circo) | 7.0 |
| Sulfur | 45.0 |
| Blow line in exothermic piece | No |
| Exothermic max. temp., °F | 380 |
| Molding | Very good |
| Cure 20' at 340° F.: | |
| Tensile | 5420 |
| Elongation | 3.0 |
| Hardness | 85 |
| Cure 25' at 340° F.: | |
| Tensile | 2.7 |
| Elongation | 2.7 |
| Hardness | 87 |
| Cure 30' at 340° F.: | |
| Tensile | 6480 |
| Elongation | 3.0 |
| Hardness | 88 |

*Example 19*

100 parts of 30-mesh whole-tire scrap (fiber-free) were mixed with 20 parts of sulfur, 8.0 parts of petroleum resin (PDO-40), and 2 parts of Turgum-S. This mixture was passed thru said 3" plasticator whose jacket temperature was 275° F. The process temperature was approximately 330° F. as measured by a thermocouple placed about in the center of the barrel and next externally to the liner.

The particular product of Example 19 was too dry and friable to compound by itself.

When the product of Example 19 was used to replace hard rubber dust in hard rubber formulations, the following results were obtained:

| | Example 19 | Example 19a | Hard Rubber Dust |
|---|---|---|---|
| Formulation: | | | |
| GR-S | 100 | 100 | 100. |
| Hard rubber dust | 100 | 100 | 100. |
| Product of Example 19 (in powdered form) | 100 | 100 | 200. |
| Petroleum oil (Circo) | 7 | 7 | 7. |
| Sulfur | 45 | 36 | 36. |
| Aldehyde amine accelerator (808) | 3 | 3 | 3. |
| Blow line in exothermic piece | No | No | No. |
| Exothermic max. temp. °F | 384 | 368 | 367. |
| Molding | Very good | Very good | Fair. |
| Cure 20' at 340° F.: | | | |
| Tensile | 4,470 | 4,955 | 3,340. |
| Elongation | 2.3 | 3.5 | 2.7. |
| Hardness | 81 | 83 | 80. |
| Cure 25' at 340° F.: | | | |
| Tensile | 4,910 | 5,520 | 3,360. |
| Elongation | 2.0 | 2.2 | 2.7. |
| Hardness | 83 | 86 | 83. |
| Cure 30' at 340° F.: | | | |
| Tensile | 5,190 | 5,610 | 3,390. |
| Elongation | 2.1 | 2.2 | 3.0. |
| Hardness | 83 | 86 | 83. |

*Example 20*

100 parts of 30-mesh fiber-free whole-tire crumb were mixed with 15.0 parts of pulverized sulfur and 5.0 parts of petroleum resin and passed thru said 3" plasticator as above at a thruput of 30 pounds per hour. The jacket temperature of the machine was 309° F. The resulting material was then refined once on a laboratory refiner.

When 500 parts of the refined material were compounded with 30 parts of sulfur, 28 parts of chemically hydrated lime, and 3 parts of an accelerator (e. g., a reaction product of butyraldehyde and butylidene aniline), and curved for 20 minutes at 338° F., an excellently molded hard rubbed product was obtained. The cured ruber has a tensile strength of 3183 pounds per square inch, an elongation of 1.8%, and a Shore D hardness of 88.

*Example 21*

100 parts of 30-mesh fiber-free whole-tire scrap were mixed with 15.0 parts of sulfur, 8.0 parts of petroleum resin (PDO–40), and 2.0 parts of Sonastic (softening point 145° F. maximum and 140° F. minimum, acid No. 150 maximum and 146 minimum with a trace of toluene-insoluble material), 6.25 parts of phenolic resin (Durez 13355—a two-stage resin formed first as a thermoplatic resin short of formaldehyde and then formed into a thermosetting resin by the addition of hexa during the grinding operation), and 3.75 parts of plasticizer (Durez 50800). This mixture was passed thru said 3" plasticator whose jacket temperature was 250° F. The operating temperature was above 300° F.—a reading of 290° F. having been given by a thermocouple about 6" forward of the center of the barrel and next externally to the liner.

When the product was press-cured 20' at 338° F. in the following formulation:

| | |
|---|---|
| Product of Example 21 | 100.0 |
| Sulfur | 7.0 |
| Warner's lime | 5.6 |
| Aldehyde-amine accelerator (A-32) | 0.6 | a maximum exothermic heat of 342° F. was obtained. The tensile strength was 2822#/sq. in., the elongation was 0.8% and the Shore D hardness was 88.

To insure most effective dispersion, the reclaimed product of Examples 12–21 should be compounded as follows pursuant to the invention:

The reclaimed product is first banded on a tight mill so that a very small bank is formed in the nip. For a 150-gram batch of the reclaimed product, the mill opening is about 0.015" on a 6" x 12" mill, and the roll temperature about 150° F.; then some of the oil normally used in the complete compound, e. g., 15 grams, is slowly added to the reclaimed product, taking care to prevent breaking up the material into bits. Ordinarily just enough of the oil is added to make the reclaimed product smooth and plastic. The remainder of the oil may be added later to the compound in the usual manner. The proper proportion of the reclaimed product which has been masterbatched with oil is left on the mill and the plasticized new polymer, e. g., GR-S, is fed into the masterbatch on the mill. After cutting back and forth several times, with the mill adjusted for a low bank, the remainder of the compounding ingredients are added.

Since certain changes may be made in the products set forth and in carrying out the above processes, and different embodiments of the invention may be provided without departing from the scope of the invention, it is intended that all matter contained in the above description or shown in the accompanying drawing shall be interpreted as illustrative and not in a limiting sense.

I claim:

1. The process of reclaiming vulcanized rubber which comprises mixing soft vulcanized rubber with from about 2.5% to about 20% by weight of free sulfur, and subjecting the soft vulcanized rubber in the presence of the sulfur to the continuous kneading action of mechanical working at a temperature of from about 300° F. to about 500° F. which plasticizes the soft vulcanized rubber to reclaim it.

2. A process as set forth in claim 1 wherein not over 16% by weight of sulfur is mixed with the vulcanized rubber prior to reclaiming.

3. A process as set forth in claim 1 wherein the reclaimed product is converted into discrete particle form mixed in such form with raw rubber, and vulcanized therewith.

4. A process as set forth in claim 1 wherein the vulcanized rubber is mixed with a long-chain synthetic polymeric amide material which has recurring amide groups as an integral part of the main polymer chain, as well as with sulfur.

5. A process as set forth in claim 4 wherein the proportion of the synthetic polymeric amide material with respect to the vulcanized rubber is not more than 35%.

6. A vulcanizable reclaimed product produced by the process of claim 4.

7. A process wherein the product of claim 1 is mixed with raw rubber and vulcanized in the presence of additional sulfur.

8. A process as set forth in claim 7 wherein oil is milled in prior to the mixing with the raw rubber, and the additional sulfur is added after the mixing with the raw rubber.

9. The process of transforming soft vulcanized rubber into a plastic reclaimed product vulcanizable into a hard product which comprises mixing the soft vulcanized rubber with from about 2.5% to about 5% by weight of sulfur and reclaiming by subjecting it to the continuous kneading action of mechanical working at a temperature of from 300° F. to 500° F. which plasticizes the soft vulcanized rubber to reclaim it.

10. The process of producing a hard product which comprises mixing soft vulcanized rubber with from about 2.5% to about 20% by weight of sulfur, and subjecting the soft vulcanized rubber in the presence of the sulfur to the continuous kneading action of mechanical working at a temperature of from 300° F. to 500° F., which plasticizes the soft vulcanized rubber to reclaim it and thereafter vulcanizing in the presence of additional sulfur in an amount which when added to the amount of sulfur mixed with the vulcanized rubber will bear the relationship to the rubber hydrocarbon present of from 25 to 47 parts of sulfur per 100 parts of rubber hydrocarbon.

11. A process as set forth in claim 10 wherein the soft vulcanized rubber is mixed with a long-chain synthetic polymeric amide material which has recurring amide groups as an integral part of the main polymer chain, as well as with sulfur.

12. The process of producing a rubber-like product which comprises mixing vulcanized rubber scrap and between 5% and 15% of thermosetting phenol formaldehyde resin, reclaiming the rubber by a working and plasticizing action at a temperature of from about 300° F. to about 500° F., and curing the resulting composition.

13. A process as set forth in claim 12 wherein the curing takes place in the presence of from about 25 parts to about 47 parts of sulfur per 100 parts of rubber hydrocarbon.

14. A product produced by the process of claim 13.

15. The process of producing a rubber-like product which comprises mixing at least 65 parts by weight of vulcanized rubber scrap and not over 35 parts of thermosetting phenol formaldehyde resin and an amount of the sulfur from about 3% to about 4% of the vulcanized rubber scrap, reclaiming the rubber by a working and plasticizing action at a temperature of from about 300° F. to about 500° F., and curing the resulting composition.

16. The process of producing a composition which is moldable into a rubber-like product which comprises mixing vulcanized rubber scrap and thermosetting phenol-formaldehyde resin and reclaiming the rubber by subjecting the mixture to a working and plasticizing action at a temperature of from about 300° F. to about 500° F.

17. A process as set forth in claim 16 wherein there is included in the mix at least 2.5% of sulfur with respect to the weight of the vulcanized rubber scrap.

18. A product produced by the process of claim 16.

19. A process as set forth in claim 16 wherein the proportion of said resin is not more than 35 parts to 65 parts by weight of vulcanized rubber scrap.

20. A process as set forth in claim 19 wherein there is included in the mix from 3% to 4% of sulfur with respect to the vulcanized rubber scrap.

21. A product produced by the process of claim 17.

22. The process of forming a molding powder which comprises mixing scrap soft vulcanized rubber with from 6% to 20% by weight of added sulfur, subjecting the soft vulcanized rubber in the presence of the sulfur to the continuous kneading action of mechanical working at a temperature of from about 300° F. to about 500° F. which plasticizes the soft vulcanized rubber to reclaim it, and converting the reclaim into discrete particle form.

References Cited in the file of this patent
UNITED STATES PATENTS 838,419   Karavadine _____ Dec. 11, 1906